(12) United States Patent
Rolfe et al.

(10) Patent No.: US 6,691,361 B2
(45) Date of Patent: Feb. 17, 2004

(54) EXTENSIBLE PLATFORM ON AN EXTENSIBLE PASSENGER LOADING BRIDGE

(75) Inventors: Daniel Rolfe, Carlsbad Springs (CA); John Savage, Gloucester (CA)

(73) Assignee: DEW Engineering and Development Limited, Ottawa (CA)

( * ) Notice: Subject to any disclaimer, the term of this patent is extended or adjusted under 35 U.S.C. 154(b) by 49 days.

(21) Appl. No.: 09/820,950

(22) Filed: Mar. 30, 2001

(65) Prior Publication Data

US 2002/0138924 A1 Oct. 3, 2002

(51) Int. Cl.[7] .............................. E01D 1/00; E01D 15/10
(52) U.S. Cl. .......................................... 14/71.5; 14/71.1
(58) Field of Search ................................... 14/71.5, 69.5

(56) References Cited

U.S. PATENT DOCUMENTS

| | | | | |
|---|---|---|---|---|
| 3,046,908 A | * | 7/1962 | Der Yuen ..................... | 104/20 |
| 3,060,471 A | * | 10/1962 | Der Yuen ..................... | 14/71.5 |
| 3,121,243 A | * | 2/1964 | Phillips ....................... | 14/71.5 |
| 3,484,883 A | * | 12/1969 | Van Marle ................... | 14/71.5 |
| 3,541,626 A | * | 11/1970 | Eggert, Jr. ................... | 135/128 |
| 3,581,331 A | * | 6/1971 | Fisher et al. ................. | 14/71.5 |
| 3,964,118 A | * | 6/1976 | Meyers et al. ............... | 14/75.5 |
| 3,983,590 A | | 10/1976 | Anderberg | |
| 4,110,859 A | | 9/1978 | Lichti | |
| 4,490,869 A | * | 1/1985 | Morin ......................... | 14/71.5 |
| 4,620,339 A | | 11/1986 | Shepheard | |
| 4,715,077 A | | 12/1987 | Shepheard | |
| 4,852,197 A | | 8/1989 | Thomas, Jr. | |
| 4,971,510 A | | 11/1990 | Houle | |
| 5,040,257 A | | 8/1991 | Bentz | |
| 5,154,569 A | | 10/1992 | Eryou et al. | |
| 5,257,431 A | | 11/1993 | Larson et al. | |
| 5,524,318 A | | 6/1996 | Thomas | |
| 5,603,343 A | | 2/1997 | Larson | |
| 5,761,757 A | | 6/1998 | Mitchell et al. | |
| 6,122,789 A | | 9/2000 | Stephenson et al. | |
| 6,195,826 B1 | * | 3/2001 | Lebaron et al. .............. | 14/71.5 |
| 6,212,724 B1 | * | 4/2001 | Zhou ........................... | 14/71.5 |
| 6,330,726 B1 | * | 12/2001 | Hone et al. .................. | 14/71.5 |

* cited by examiner

Primary Examiner—Robert E. Pezzuto
Assistant Examiner—Raymond W Addie
(74) Attorney, Agent, or Firm—Freedman & Associates

(57) ABSTRACT

When a loading bridge is connected to a small aircraft to allow passengers to board or deplane, a large size difference exists between the aperture of a loading bridge and the entry/exit hatch of a small aircraft; the loading bridge aperture being larger than the aircraft hatch. Accordingly, the size difference creates a potentially dangerous gap. The extensible platform on an extensible passenger loading bridge is for alleviating the gap and as such for providing a safe pathway to passengers when they board or deplane.

20 Claims, 15 Drawing Sheets

EXTENSIBLE PLATFORM ON AN EXTENSIBLE PASSENGER LOADING BRIDGE

The present invention relates to extensible passenger loading bridge and more particularly to extensible passenger loading bridge comprising an extensible platform adaptable to small commuter aircraft for allowing safe boarding and deplaning of passengers.

BACKGROUND OF THE INVENTION

The aircrafts customarily utilized in regional commuter service and general aviation are smaller than commercial jet aircraft. Their door openings are closer to the tarmac and the doors are designed to include their own stairs and handrails. The doors open outwardly and swing downwardly from the aircraft to the tarmac. The stairs and their associated rails are dragged along with the door toward the tarmac, which place the stairs in an appropriate position to be used by the passengers. Even if such a system is well conceived, the use of stairs for boarding or deplaning is limiting if not forbidding the accessibility of a small aircraft for many physically impaired people. U.S. Pat. No. 4,971,510 to Houle disclosed a wheelchair passenger device in the form of a cab that can be elevated to the level of an aircraft floor. Such a device is not applicable to small aircraft because the doors are equipped with stairs. Identically, the presence of the stairs and rails block the approach of any boarding bridge currently in use in airports. Moreover, many bridges are not compatible with the level that would allow access to the entry door of these small aircrafts.

For security purposes, it is also important to address such a problem. Indeed, without a loading bridge adaptable to these small aircraft, the passengers have to cross the space between a terminal of an airport and the aircraft by walking in the open on the tarmac surrounded by the aircrafts noise, gas smell, under the rain or the snow or a burning sun, depending of the weather conditions. It is dangerous to have to circulate on the tarmac. It is an important issue to insure that the passengers reach the plane or the terminal in a safe condition.

Many types of loading systems or safety device have already been disclosed (U.S. Pat. Nos. 5,603,343; 3,983,590; 4,620,339; 4,715077; 5,040,257; 5,257,431; 4,852,197; 4,110,859). However, they are adapted to large aircraft which have no stairs attached to their doors. As such, airports are equipped with such loading systems that allow passengers to board and deplane safely. The interface between the loading bridge and the aircraft, or the canopy has an aperture which size is compatible with doors of large aircrafts. For an economical purpose, it would be worthwhile to modify the existing interface of such a loading bridge to adapt it to small aircraft whose doors are differently conceived.

In U.S. Pat. No. 5,524,318 to Thomas, a mobile self-propelled aircraft loading bridge adaptor for bridging between small aircraft and the conventional bridge entry ways provided at airports for use with standard size jets and similar aircraft is disclosed. The bridge is supported by adjustable lifts that provide independent elevation and lowering of the parts of the bridge connected to the lifts.

In U.S. Pat. No. 5,761,757 to Mitchell et al., a passenger boarding bridge for providing a passageway from an aircraft to a passenger terminal including a cab section with a floor is disclosed. The floor section of the bridge is provided with a cutout portion that can accommodate the stair components of commuter aircraft. The adaptor of Mitchell comprises many parts that have to slide or move relatively to each other. Therefore, it necessitates a lot of maintenance to be adapted to a small aircraft or to be reconfigured to fit larger aircrafts. An alternative is to construct a new bridge for exclusive use with small aircraft.

In U.S. Pat. No. 6,122,789 to Stephenson et al., an aircraft passenger boarding bridge system including a cab portion laterally slidable and retractable floor members is disclosed. The system provides access between an airport terminal and transporting aircraft of differing size and specifications, such as large commercial airliners, smaller commuter jets, and turbo prop aircraft. However, the system necessitates a lot of adaptations to accommodate such a variety of aircrafts. For example, the cab portion has sliding means to be adapted and eventually removed from the boarding bridge; this implies that the end of the boarding bridge in contact with the cab should also be modified to receive such a cab. Furthermore, the cab is equipped with many retractable floor members and optionally a pivoting floor to maintain a level position relative to the ground. Suitable means, preferably electric motors and associated controls, also have to be provided to operate the retracting floor members and the side shift feature. Therefore, the aircraft passenger boarding bridge system necessitates a lot of maintenance to be adapted to a small aircraft or to be reconfigured to fit larger aircrafts.

For an economical purpose, and to avoid having a plurality of bridges, limiting the maintenance and space required for positioning of bridges, an interface easily adaptable to existing loading bridges that overcomes the above disadvantages would be advantageous.

Therefore, it is an object of the present invention to provide an interface capable of functioning with a variety of aircraft and overcoming some of the above disadvantages.

It is a further object of the present invention to provide a passenger loading bridge ensuring a safe passage of passengers while they are boarding or deplaning.

SUMMARY OF THE INVENTION

In accordance with an aspect of the present invention, there is provided a passenger loading bridge interface for accommodating aircraft having a door equipped with a stairs. The passenger loading bridge interface comprises:

a first edge for connection to a passenger loading bridge;

a second edge for mating with an aircraft having at least a first portion of a size sufficient to mate with the door of the aircraft and a second portion being movable into at least an extended position for mating with an aircraft having a door with a top step approximately coplanar with the aircraft floor when the first portion engages the top step and an other than extended position for mating with an aircraft having a door absent a top step approximately coplanar with the aircraft floor when the first portion engages the airplane above the first step, the first and second edge delineating a floor; and, a drive for moving the second portion between the extended position and the other than extended position.

In accordance with another aspect of the present invention, there is provided a passenger loading bridge interface for accommodating aircraft having a door equipped with a stairs. The passenger loading bridge interface comprises:

a first edge for connection to a passenger loading bridge; and, a second edge for mating with an aircraft having at least a first portion of a size sufficient to mate with the door of the aircraft and a second portion being movable into at least an extended position for mating with an aircraft having a door with a top step approximately coplanar with the aircraft floor when the first portion engages the top step and an other than extended position for mating with an aircraft having a door absent a top step approximately coplanar with the aircraft floor when the first portion engages the airplane above the first step, the first and second edge delineating a floor.

In accordance with a further aspect of the present invention, there is provided a passenger loading bridge interface for accommodating aircraft having a door equipped with a stairs. The passenger loading bridge interface comprises:

a first edge for connection to a passenger loading bridge;

a second edge for mating with an aircraft having at least a first portion of a size sufficient to mate with the door of the aircraft and a second portion being movable into at least an extended position for mating with an aircraft having a door with a top step approximately coplanar with the aircraft floor when the first portion engages the top step and an other than extended position for mating with an aircraft having a door absent a top step approximately coplanar with the aircraft floor when the first portion engages the airplane above the first step, the first and second edge delineating a floor;

a mechanism for positioning the second portion in the extended position and in the other than extended position;

a further mechanism for extending a first side of the second portion and a second further mechanism for extending a second opposing side of the second portion independent of the first side of the second portion; and whereby upon a curvature of an aircraft the further mechanism and the second further mechanism allow an angled contact between the aircraft side and the second portion.

BRIEF DESCRIPTION OF THE INVENTION

Figure 5A:
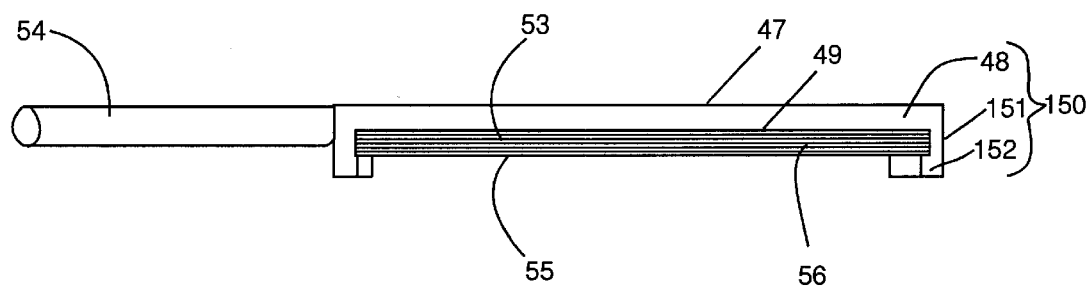
FIG. 5a is a front view of the floor of the aircraft interface.
Figure 5B:
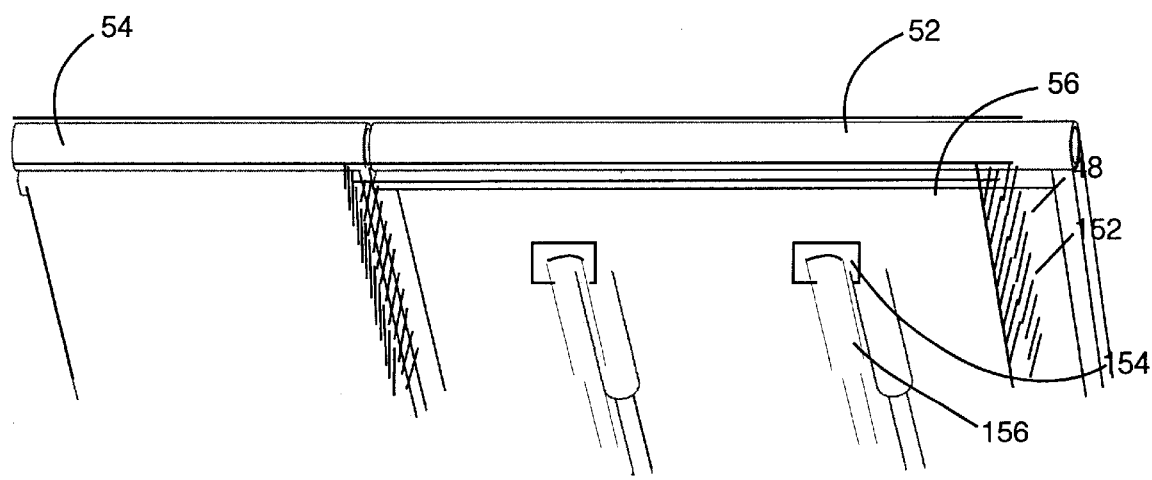
Figure 6:
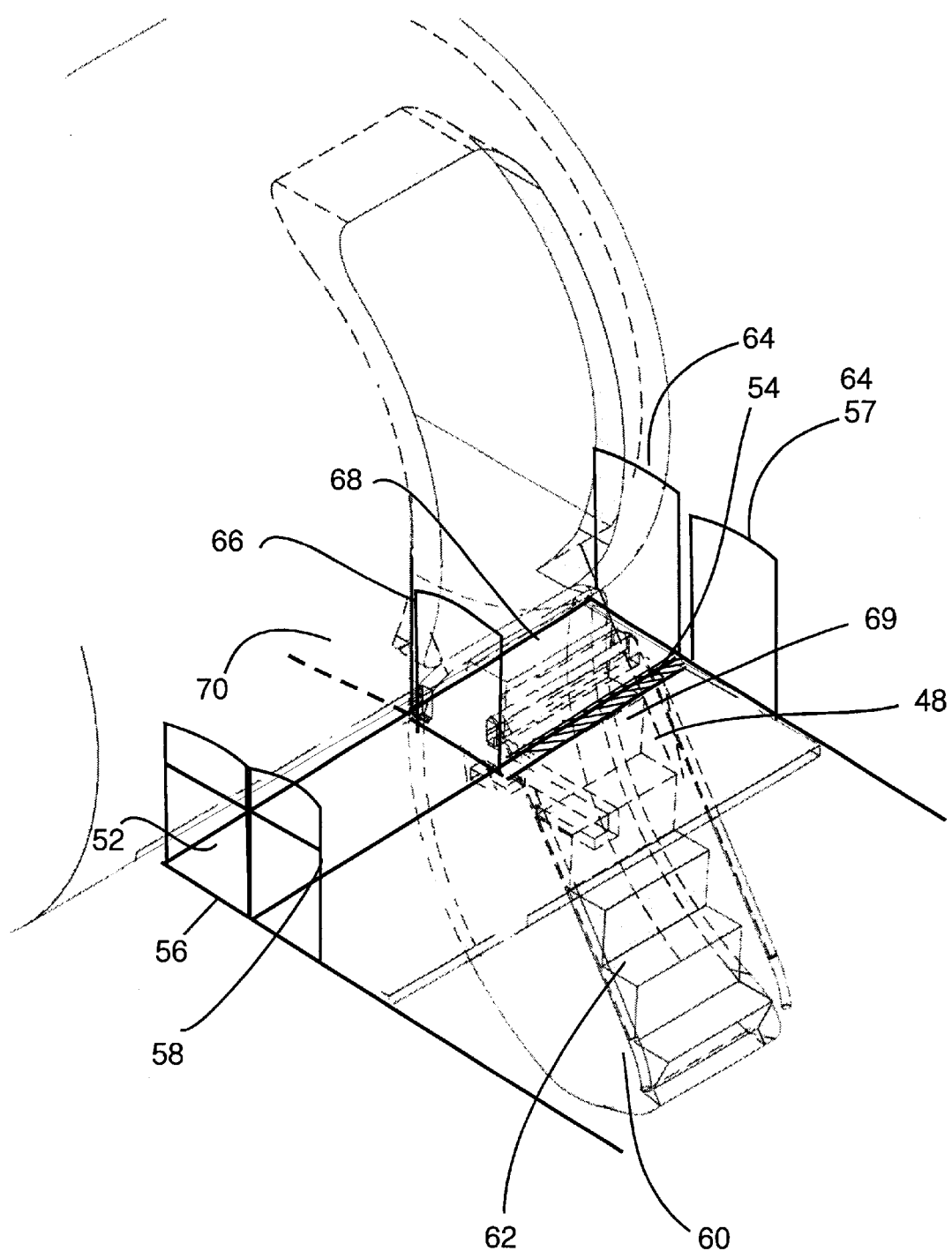
Figure 7:
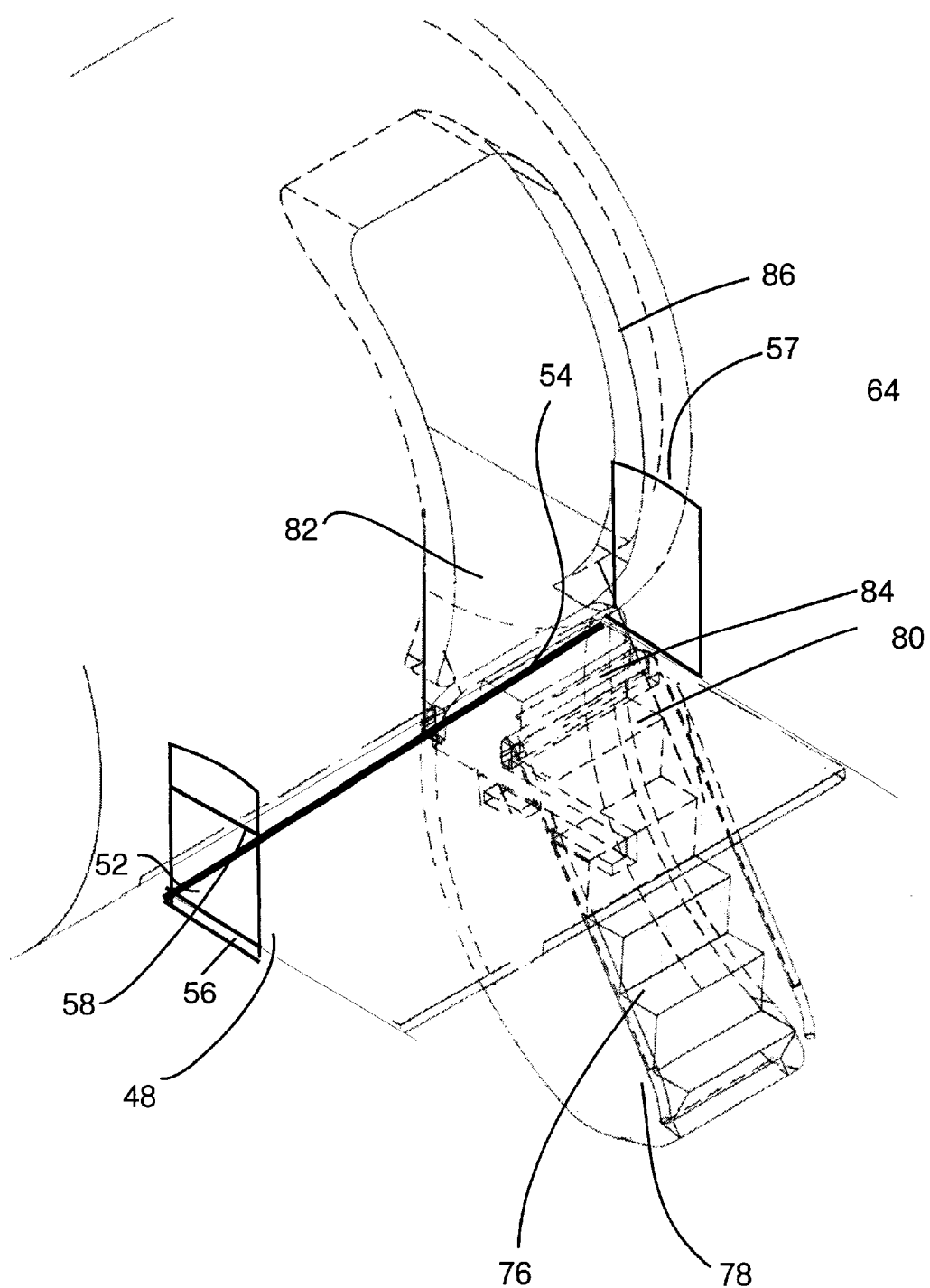
Figure 8:
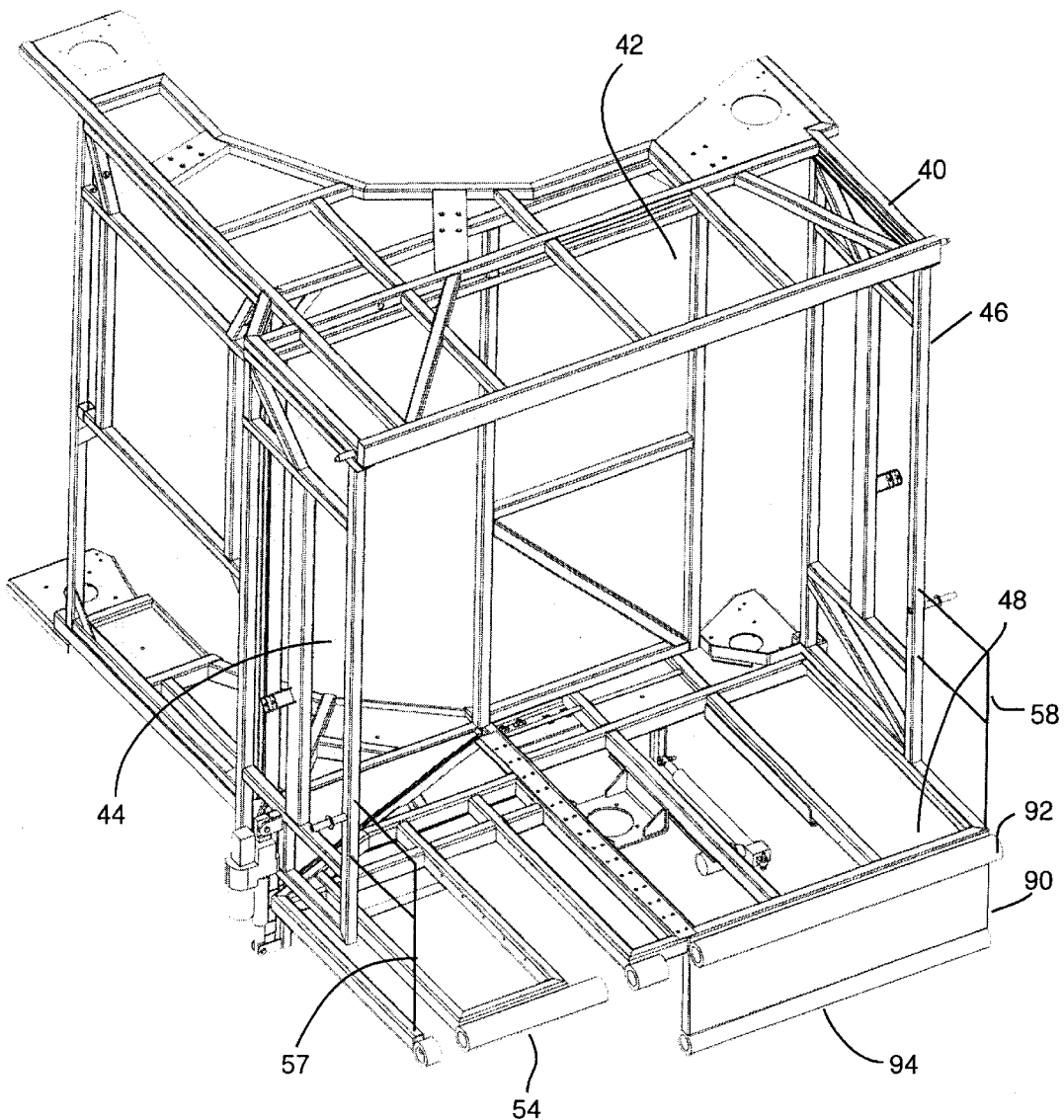
Figure 9A:
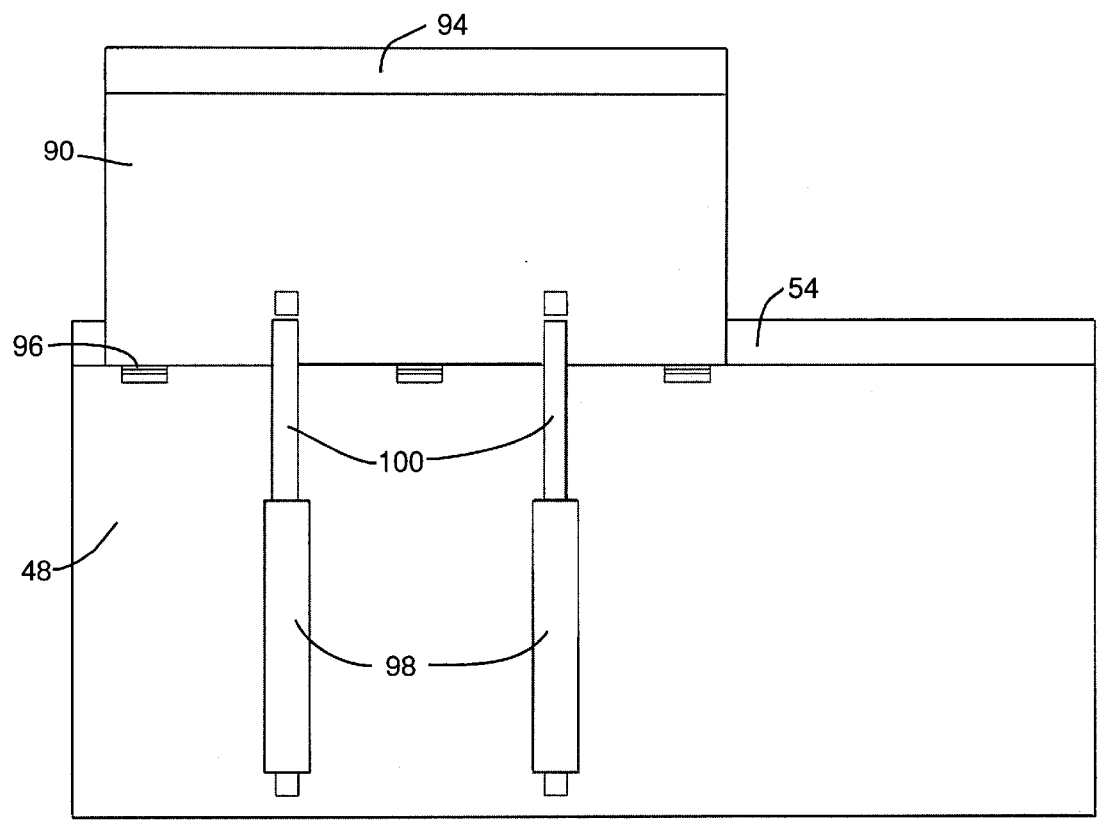
Figure 9B:
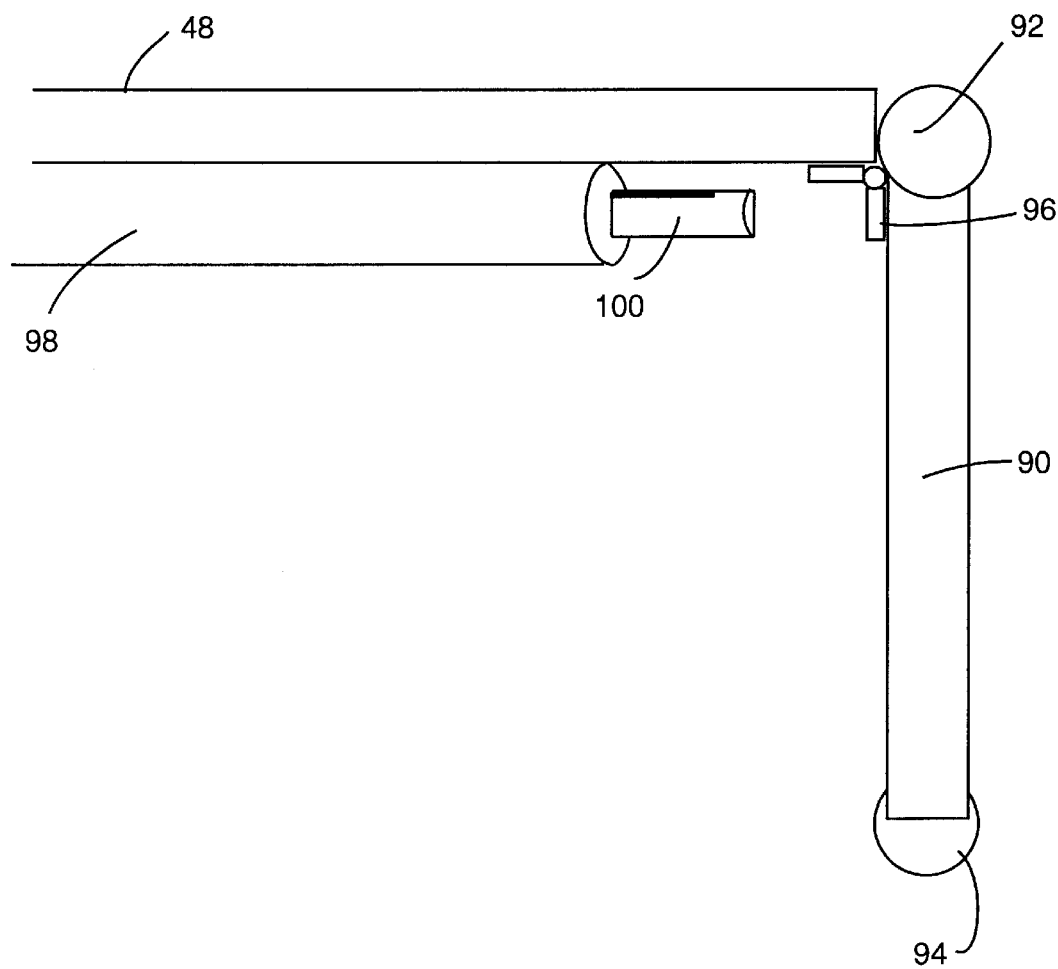

FIGS. 5b and c are bottom views of the aircraft interface in the first and second positions;

FIG. 6 is a side view of the slidable platform in a first position;

FIG. 7 is a side view of the slidable platform in a second position;

FIG. 8 is a perspective view of another preferred embodiment of the present invention wherein the aircraft interface is in the form of a flipable extension;

FIG. 9a is a bottom view of the flipable extension in an extended position;

FIG. 9b is a side view of the flipable extension downwardly flipped.

Figure 10A:
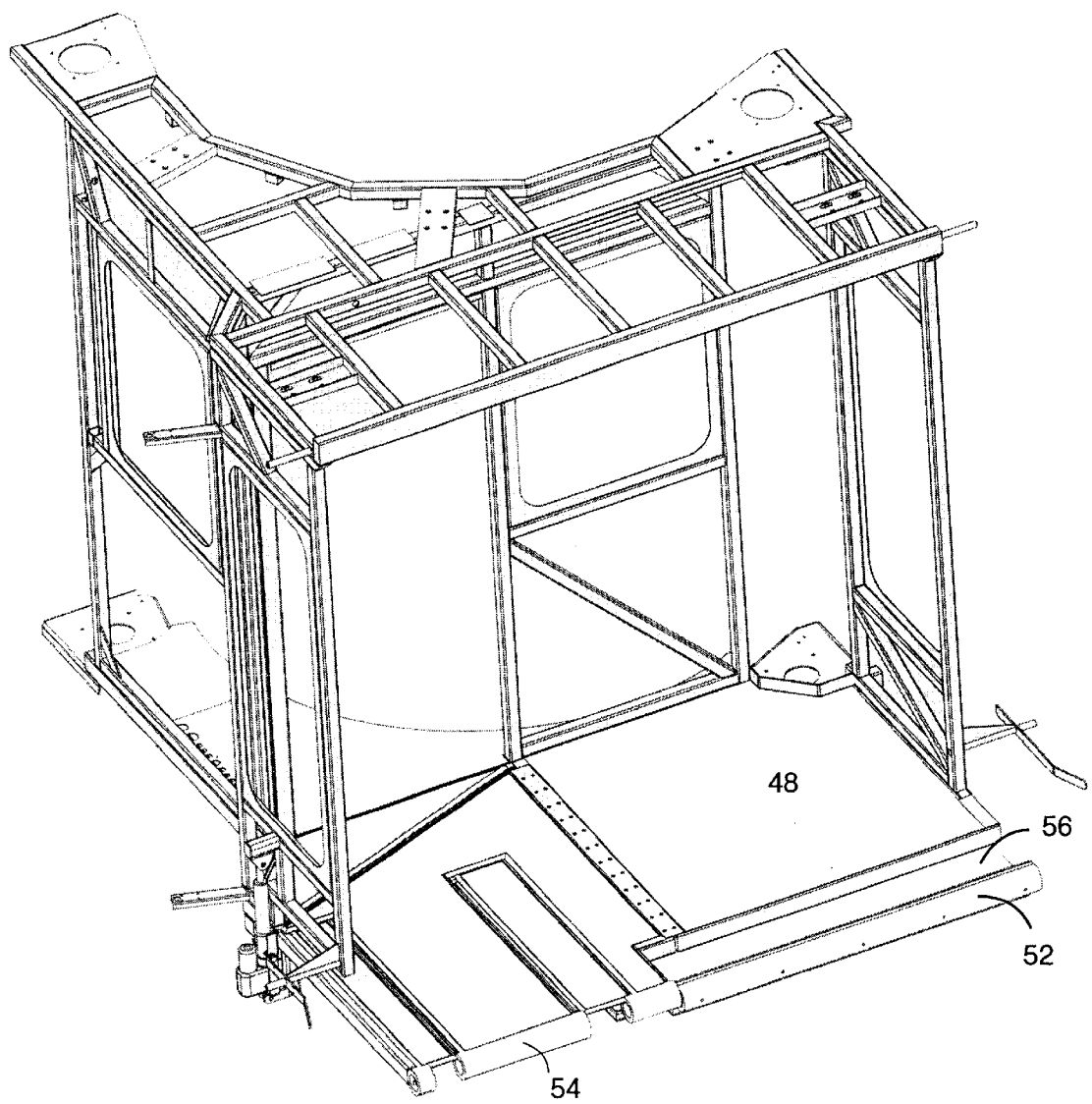
Figure 10B:
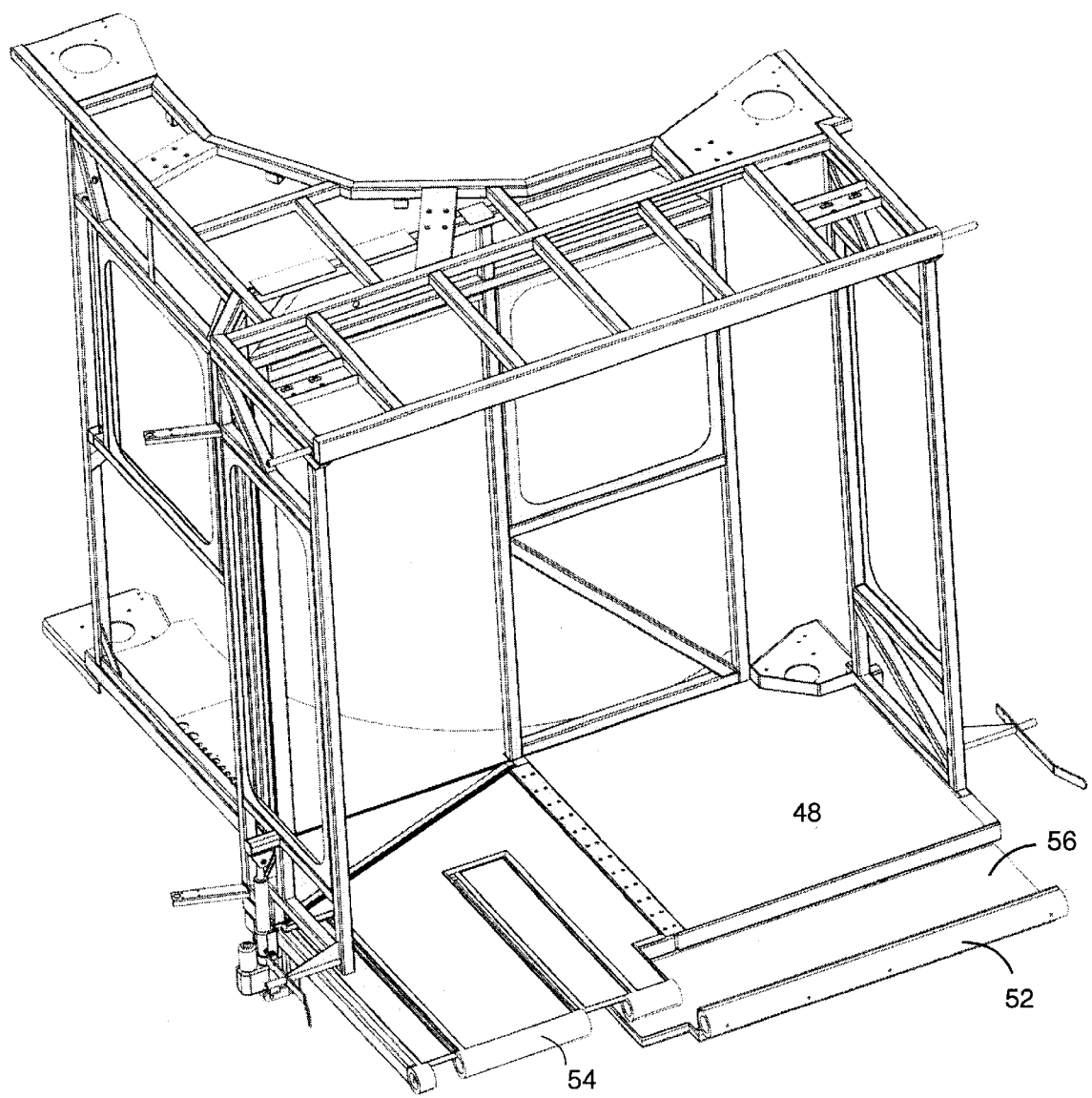

FIG. 10a is a perspective view of another embodiment of the present invention wherein the aircraft interface in the form of a slidable extension is in a neutral position; and FIGS. 10b and c are perspective view of the aircraft interface in the form of a slidable extension in a first and second position.

To facilitate the understanding of the present invention, the same numerals are used to identify the same structural elements that are shown in the different figures.

DETAILED DESCRIPTION OF THE INVENTION

Figure 1:
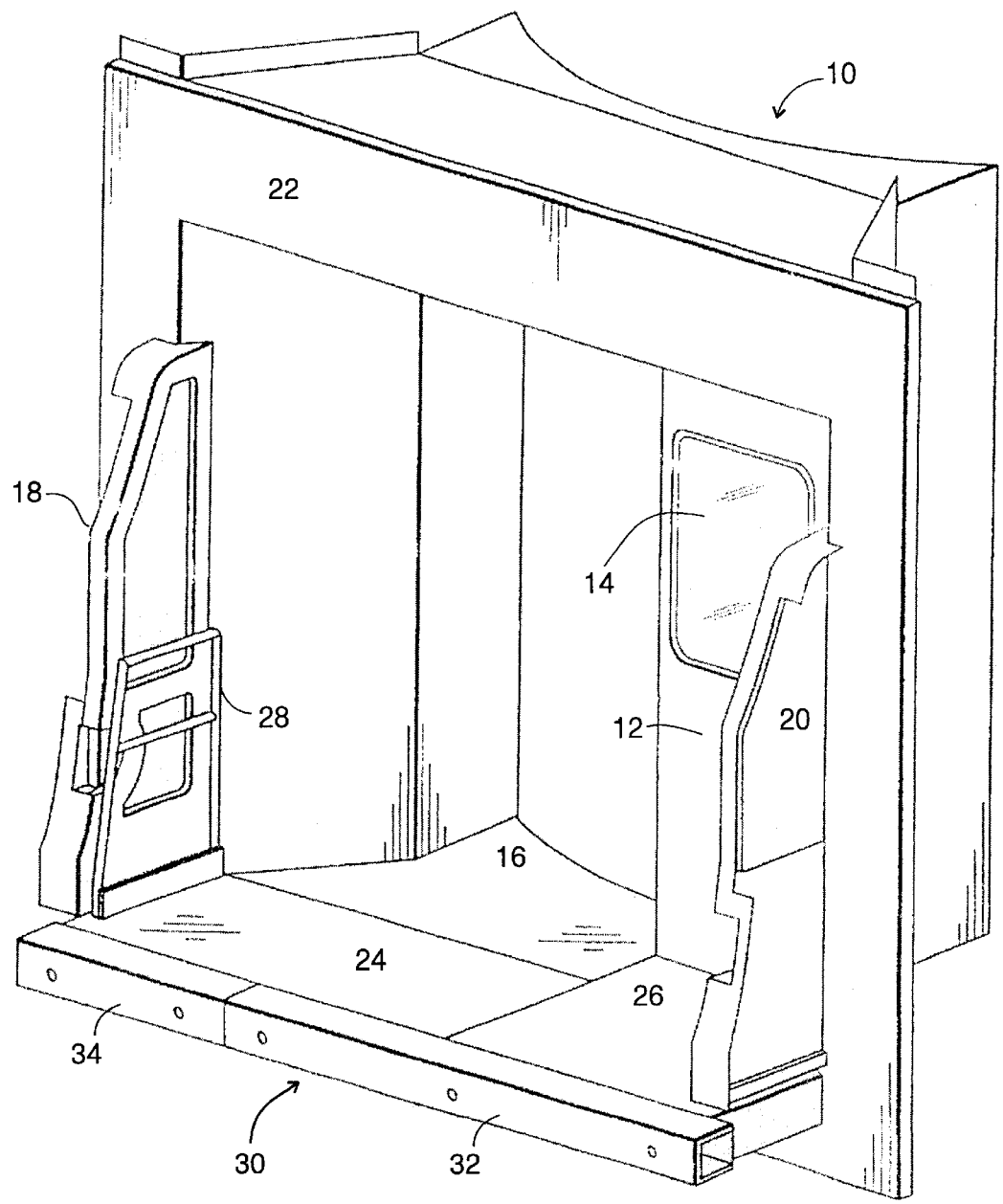
FIG. 1 is a prior art perspective view showing an interface in a first position equipping an extremity of a loading bridge for small aircraft.

FIG. 1 shows the configuration of an aircraft interface for connecting an extremity or a cab 10 of a loading bridge to an aircraft entry. In the configuration shown here, the aircraft is a large aircraft. Because such interface can be adapted to small aircraft, it has some elements relatively movable to each other. A passenger loading bridge operator's station is behind partition 12 that includes a viewing port or window 14. On the left side 18 and the right side 20 of the cab, two barriers extend from the portal panel 22. The floor of the aircraft interface is constituted of three different panels: the panel 16 is a portion of the floor that is generally at the same level than the floor of the loading bridge; the panel 26 is a portion that can be moved upwardly opening a space; the panel 24 is a slidable portion of the floor that can slide laterally in the opened space under the raised panel 26. In the configuration of this figure, all the three panels are at a same level. A handrail and movable barricade 28 is attached to the sliding panel 24. The forefront of the aircraft interface is a bumper 30 that is positioned in contact with the aircraft. The bumper 30 is divided into two bumper elements, a stationary element 32 and a movable element 34.

Figure 2:
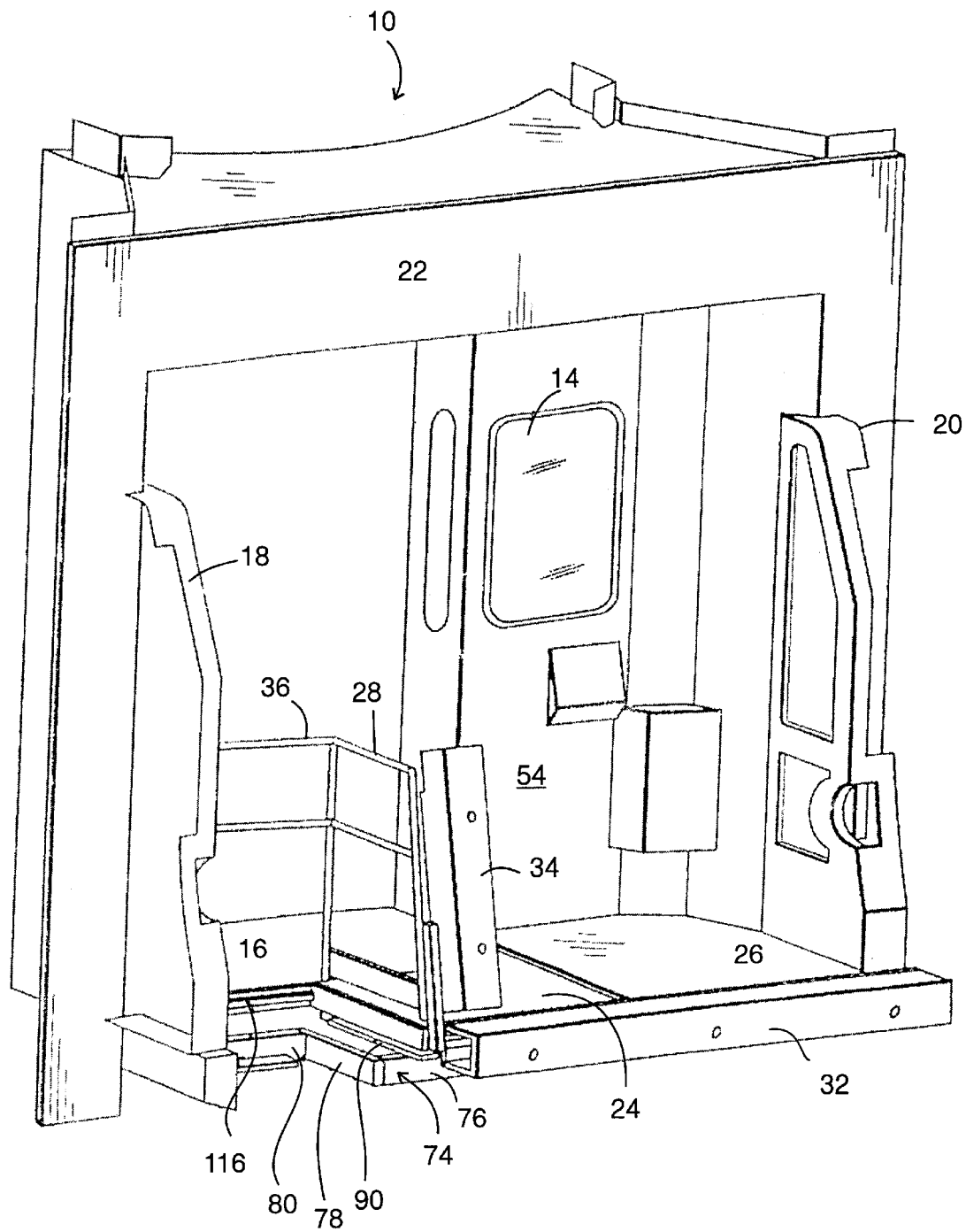
FIG. 2 is a prior art perspective view showing the interface of FIG. 1 in a second position.

Referring now to FIG. 2, the aircraft interface of FIG. 1 has been modified to fit with a small aircraft. In such a configuration, the panel 26 is raised and the panel 24 is in the opened space below the panel 26 a distance substantially identical to a small aircraft entry. The handrail and movable barricade 28 attached to the sliding panel 24 are moved laterally at the same time, as the panel 24 is slid below the panel 26 and for the same distance. By sliding laterally, an open area is created which is delineated on the left side by the barrier 18 extending from the portal panel 22, and by the handrail and movable barricade 28. Another barrier 36 extends from the handrail and movable barricade 28 to the left side by the barrier 18. The movable element 34 of the bumper is moved upwardly and slightly inboard.

Figure 3:
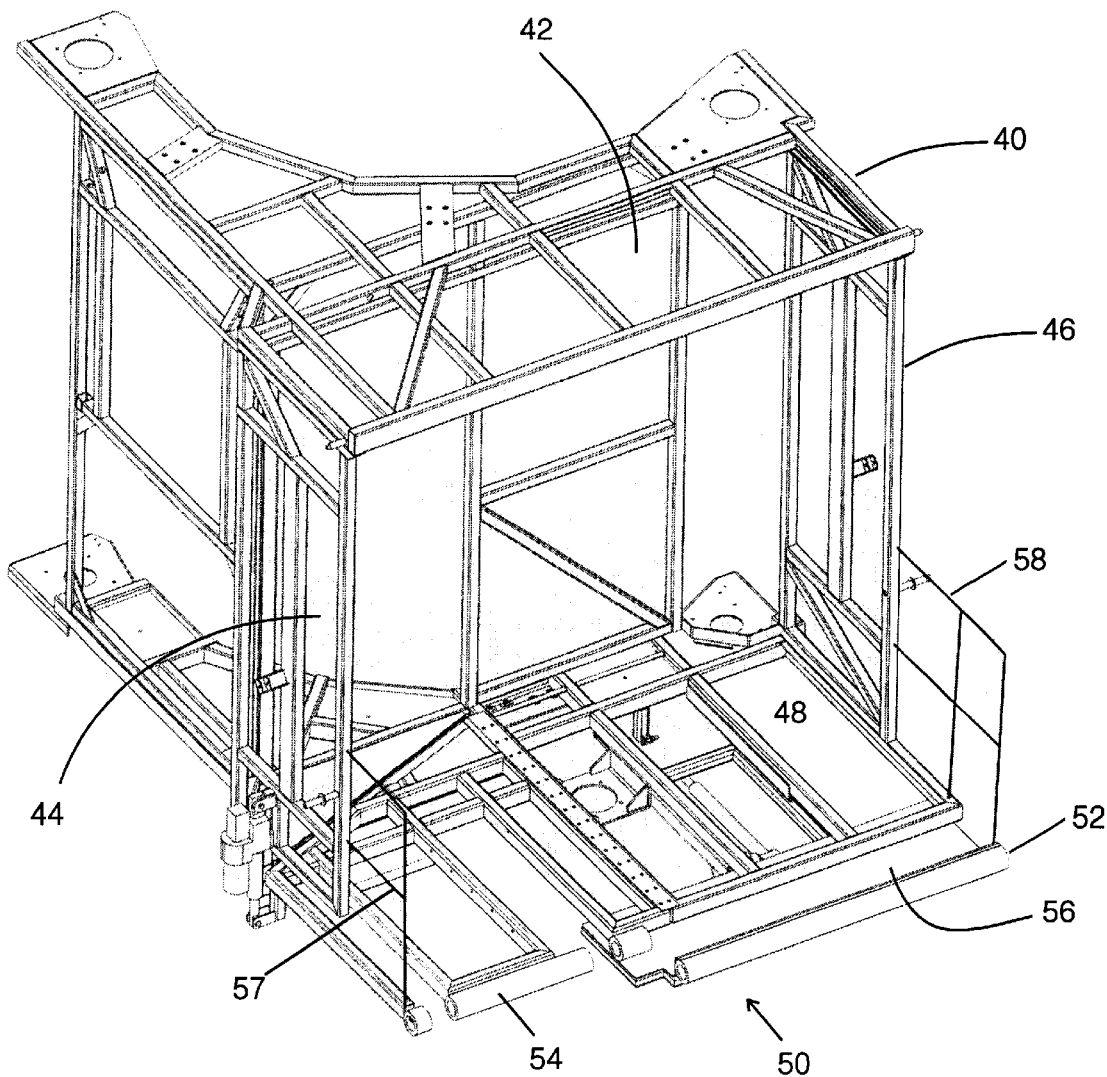
FIG. 3 is a perspective view of a preferred embodiment of the present invention wherein the aircraft interface in the form of a slidable extension is in a first position.
Figure 4:
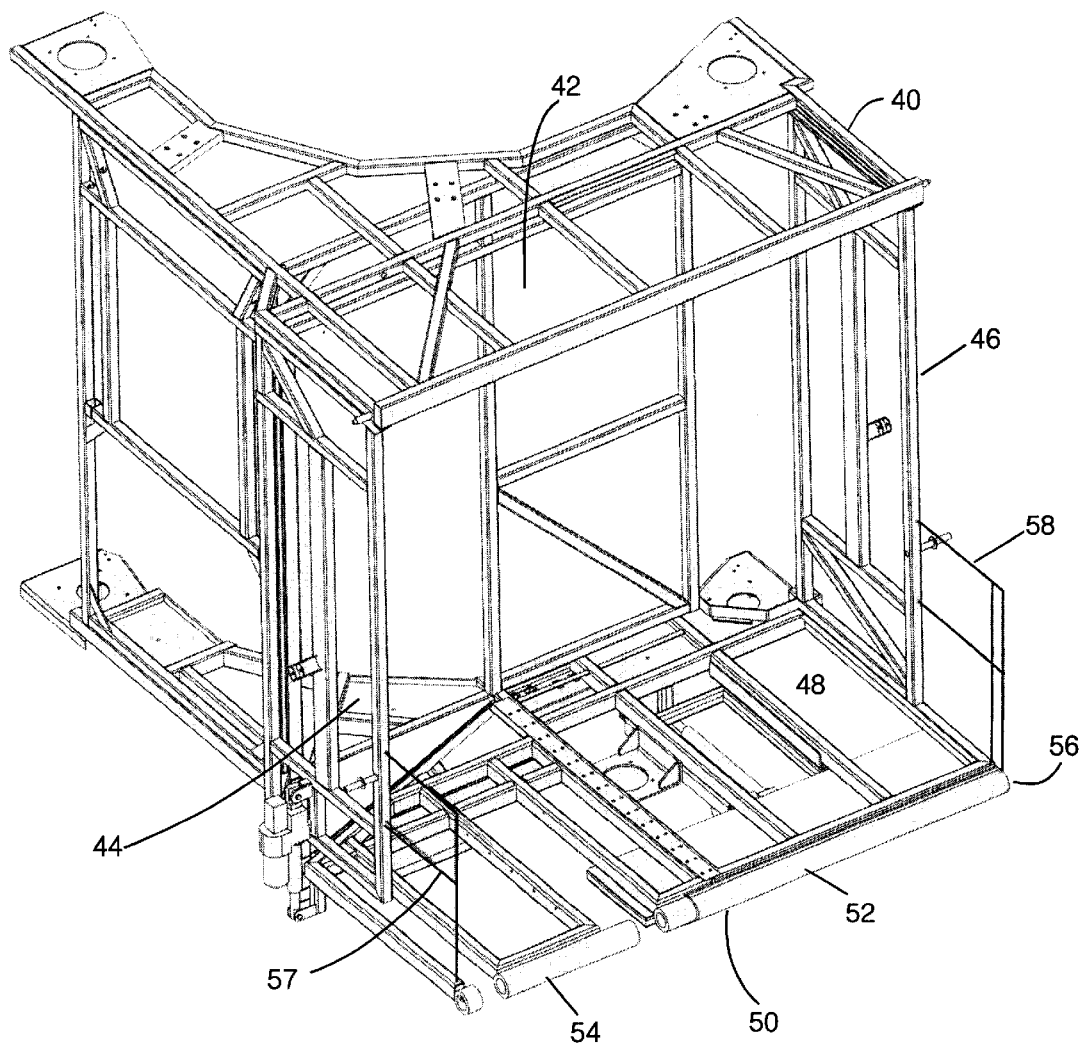
FIG. 4 is a perspective view of a preferred embodiment of the present invention wherein the aircraft interface in the form of a slidable extension is in a second position.

A preferred embodiment of the instant invention is illustrated in FIG. 3. The aircraft interface of the present invention is an interface adaptable to a variety of aircraft with a low level of maintenance. As shown in FIG. 3, the aircraft interface is suitable for use with small aircraft. The interface 40 is composed of a roof 42, a left sidewall 44 and right sidewall 46, and a floor 48. The floor 48 has a substantially rectangular shape, a part of the right and left small sides are limited by the left sidewall 44 and right sidewall 46. Another part of the small sides of the floor 48 is limited by security barrier 57 on the right side and security barrier 58 on the left side. The floor 48 is generally at the same level and adjacent to the floor of the boarding bridge to which the aircraft interface is attached. The floor 48 has an extensible portion 56 for sliding below the floor 48 in a forward and backward direction. The extensible portion 56 has a smaller size than the floor 48. A bumper 50 terminates the front edge of the floor 48; the bumper is divided into two bumper elements, a movable bumper 52 attached to the extensible portion 56 of the floor 48, and a stationary bumper 54 attached to a forefront portion of the floor 48 that is not extensible. The movable bumper 52 is longer than the stationary bumper 54. The size of the forefront portion of the floor 48 that is not extensible is substantially identical to a size of the door of the small aircraft. When the extensible portion 56 of the floor 48 is slide forward, the interface can accommodate small aircraft; conversely, when the extensible portion 56 of the floor 48 is slide backward, the interface can accommodate large aircraft or small aircraft wherein the stairs attached to the door has a top step which is other than approximately coplanar with the floor of the aircraft as shown in FIG. 4. For security purpose, the barrier 58 comprises an additional barrier element attached to a proximal corner of the extensible portion 56 of the floor 48. The additional barrier element is optionally an assembly of telescopic elements, chain type elements, or jointed and articulated bars. Advantageously, when the extensible portion of the floor 56 is extended toward the small aircraft, the additional barrier element of the barrier 58 extends the same to prevent a passenger to take this passage and fall. The sliding movement of the extensible portion 56 of the floor 48 in the forward and backward direction is achieved by a drive means in the form, for example, of a hydraulic piston or an electric actuator.

FIG. 5a shows a front view of the aircraft interface at the floor level. To facilitate understanding of the drawing, the bumper 52 is not illustrated. However, the bumper 54 is shown. This drawing is particularly important to show an embodiment for the slidable extension 56 to slide above the floor 48. In such a view, the floor shows an upper surface 47 and a lower surface 49. On a left side and a right side of the portion of the floor 48 that has the extensible portion 56 are located supports for the slidable extension 56. The supports is in the form of L-shaped holder 150 having a part 151 normal to the floor 48 and a part 152 parallel to the floor 48 that elongates inwardly. The part 152 has a thickness smaller than a length of the part 151. Therefore a space exists between the part 152 and the lower surface 49 where the slidable extension 56 is inserted and upon a mechanical support is able to slide back and forth. In such a view, the slidable extension 56 shows an upper surface 53 and a lower surface 55.

Figure 5C:
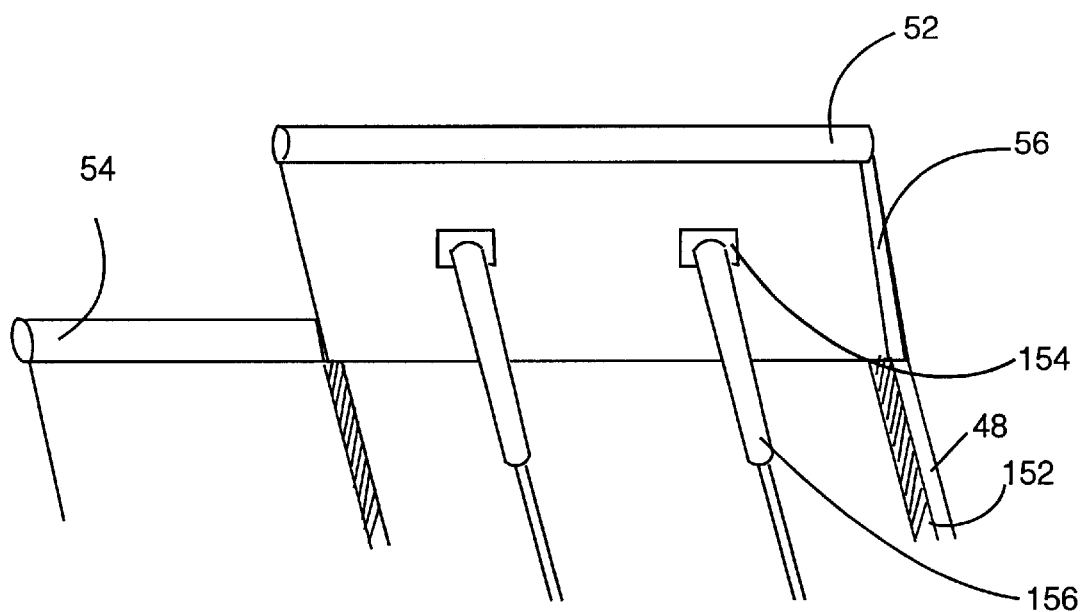

FIGS. 5b and 5c are bottom views of the aircraft interface in the first and second positions. More particularly, those two Figs. are illustrative of the mechanism that allows switching from the first to the second position of the slidable extension. The mechanism is in the form of electric actuators or pistons 156 attached at one extremity 154 to the lower surface 55 of the slidable extension between the two parts 151 of the L-shaped holder 150. When the electric actuators or pistons are activated, their length is increased a predetermined length; upon deactivation, the electric actuators or pistons return to their initial length. FIG. 5b shows the slidable extension 56 in the retracted position and the pistons 156 are deactivated. However, in FIG. 5c, the electric actuators or pistons are activated, their length is increased. Because the extremities 154 are attached to the lower surface of the slidable extension, the slidable extension is pushed forward between the L-shaped holders 150.

Referring now to FIG. 6, a side view of the aircraft interface accommodating a small aircraft is shown. The dashed lines signify that the element is hidden to the view but real. A small aircraft door 60 equipped with its own stairs 62 and a left handrail 64 and right handrail 66 is in an open state. For small aircraft, the stairs swing downwardly when the door is open. In this embodiment, the top step 68 is at a level substantially coplanar to the floor 70 of the aircraft. The aircraft interface is positioned so that the stationary bumper 54 attached to the forefront portion of the floor 48 that is not extensible bumps against the counter step 69 of the top step 68. The aircraft interface is also positioned so that the level of the floor 48 substantially coincides with the level of the top step 68. The positioning of the aircraft interface is such that the left barrier 57 of the interface is aligned with the left handrail 64. The extensible portion 56 of the floor 48 is slid toward the aircraft until the movable bumper 52 engages the aircraft. The length of the extension of the extensible portion 56 of the floor 48 corresponds the depth of the top step 68. The extensible part of the barrier 58 attached to the extensible portion 56 of the floor 48 is elongated while the extensible portion 56 is slide forward.

Referring now to FIG. 7, a side view of the aircraft interface that can accommodate large aircraft or small aircraft wherein a stairs 76 attached to a door 78 has a top step 80 whose floor does not coincide with a floor 82 of the aircraft. The dashed lines signify that the element is hidden to the view but real. The small aircraft door 78 equipped with its own stairs 76 is in an open state. For small aircraft, the stairs swing downwardly when the door is open. In this embodiment, the top step 80 is at a lower level than a level 82 of the aircraft floor. In such a configuration, the aircraft interface is positioned so that the stationary bumper 54 attached to the forefront portion of the floor 48 that is not extensible engages a top counter step 84. The aircraft interface is also positioned so that the level of the floor 48 substantially coincides with the level of the aircraft floor 82. The positioning of the aircraft interface is such that the left barrier 57 of the interface is in an alignment with a left edge 86 of an opening of the aircraft. The extensible portion 56 of the floor 48 is slid backward below the floor 48 and the bumper 52 is aligned with the bumper 54. Similarly, the barrier 58 is not extended in this configuration of the aircraft interface.

Referring now to FIG. 8, another preferred embodiment according the instant invention is shown. In this embodiment, the extensible portion of the floor 48 of the aircraft interface is in the form of a downwardly (as shown in FIG. 8) or upwardly (not shown) flipable extension 90. The interface 40 is composed of a roof 42, a left sidewall 44 and right sidewall 46, and a floor 48. The floor 48 has a substantially rectangular shape, a part of the right and left small sides are limited by the left sidewall 44 and right sidewall 46. Another part of the small sides of the floor 48 is limited by security barrier 57 on the right side and security barrier 58 on the left side. In this embodiment, the barrier 58 has no extensible part. The floor 48 is generally at the same level and adjacent to the floor of the loading bridge to which the aircraft interface is attached. A stationary bumper 54 is attached to a forefront portion of the floor 48 that is not extensible. The size of the forefront portion of the floor 48 that is not extensible is substantially identical to a size of the door of the small aircraft. The flipable extension is substantially rectangular shaped. The flipable extension 90 has a smaller size than the floor 48. A first long side of the extension is attached to an edge of the floor 48, which is not in continuation of the floor of the boarding bridge, with a hinge allowing the extension to pivot relatively to the floor 48. The above-mentioned hinge might be in the form of a plurality of hinges or any other kind of mechanism that permits two elements to pivot relatively one to the other. The flipable extension is retained in a substantially horizontal position with locking devices (not shown) located below the floor 48 of the interface. In the substantially horizontal position, the floor 48 and the flipable extension are substantially coplanar. The edge of the floor 48 to which the first long side of the flipable extension 90 is attached is equipped with a stationary bumper 92. A second long side of the extension is equipped with a bumper 94 that is in contact with an aircraft when engaged.

In FIG. 9a is shown a bottom view of the flipable extension in the extended position. The first long side of the flipable extension 90 is attached to the floor 48 and is movable relative to the floor 48 thanks to hinges 96. The second long side of the flipable extension ends with the bumper 94. The flipable extension is retained in a substantially horizontal position with locking devices 98 that are illustrated here as extensible/retractable bars 100.

In FIG. 9b is shown a side view of the flipable extension 90 in an unextended mode. When the bars 100 in the locking device 98 are retracted, then the flipable extension is not retained in a substantially horizontal plane and is allowed to swing downward. Due to the hinges 96 the flipable extension pivots relative to the floor 48 and flips downwardly resulting in an angle of about 90° between the flipable extension and the floor 48. The stationary bumper 92 along the edge of the floor 48 to which the first long side of the flipable extension 90 is attached becomes the forefront edge of the aircraft interface.

Essentially, the use of the flipable extension is similar to the use of the slidable extension. If the door of the aircraft has a top step at a level substantially coplanar to the floor of the aircraft, then the aircraft interface is positioned so that the stationary bumper 54 attached to the forefront portion of the floor 48 that is not extensible engages the counter step of the top step. The aircraft interface is also positioned so that the level of the floor 48 substantially coincides with the level of the top step. The positioning of the aircraft interface is such that the left barrier 57 of the interface is aligned with the left handrail 64. The flipable extension 90 of the floor 48 is maintained in a substantially horizontal position by the bars 100 in an extended position; therefore, the bumper 94 engages the aircraft. The size of the flipable extension 90 of the floor 48 corresponds to the depth of the top step. Because the barrier 58 has no extensible portion, an operator adds an independent barrier to prevent passengers from falling from the loading bridge when desirable.

If the door of the aircraft has a top step at a lower level than a level of the aircraft floor, the aircraft interface is positioned so that the stationary bumper 54 attached to the forefront portion of the floor 48 that is not extensible engages the top counter step. The aircraft interface is also positioned so that the level of the floor 48 substantially coincides with the level of the aircraft floor. The positioning of the aircraft interface is such that the left barrier 57 of the interface is aligned with a left edge of an opening of the aircraft. The flipable extension 90 of the floor 48 is flipped downwardly resulting in a 90° angle between the flipable extension 90 and floor 48; the bumper 92 is aligned with the bumper 54 and is directly in contact with the aircraft once positioned for enplaning and deplaning operations.

Figure 10C:
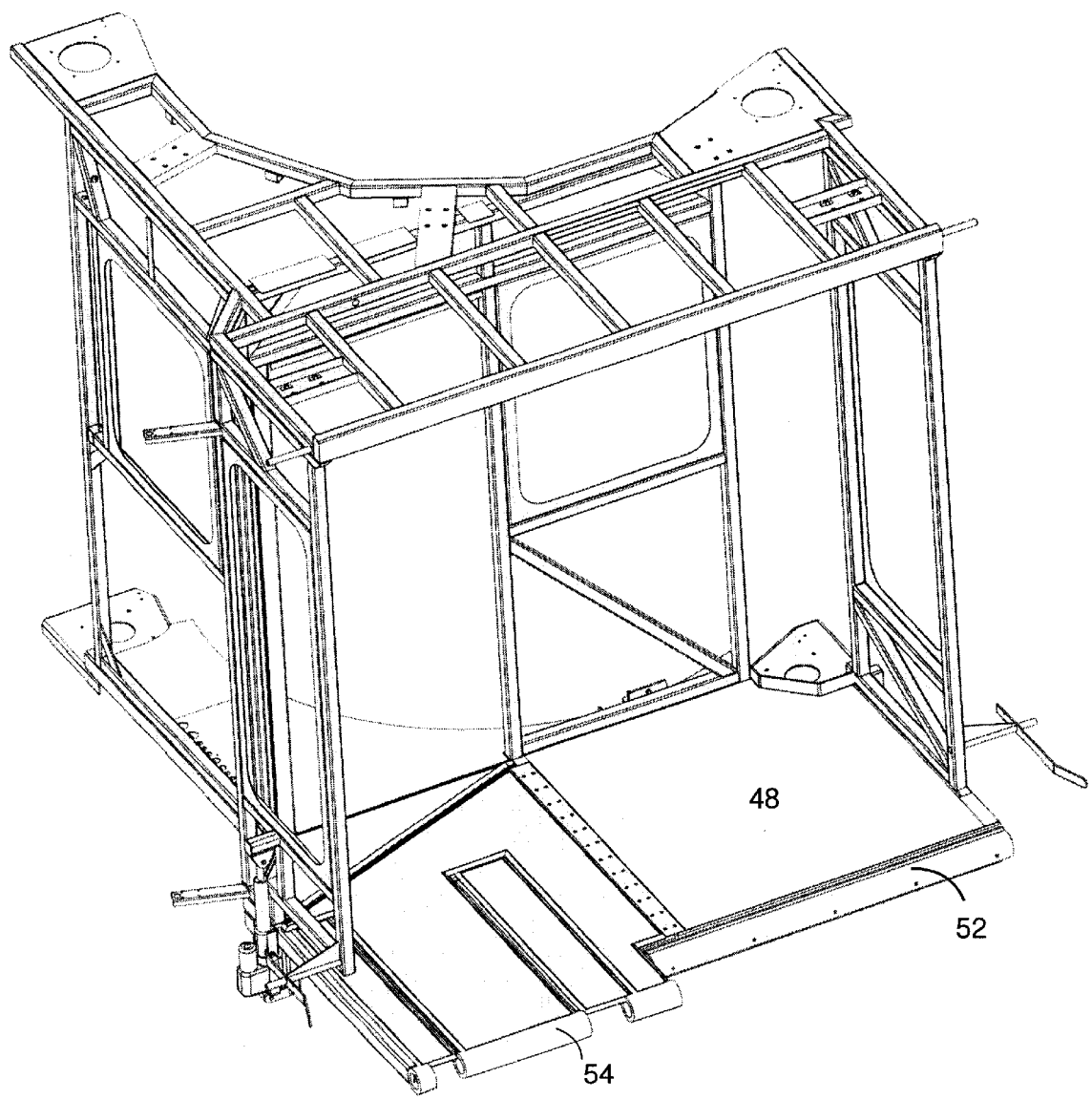

An alternative embodiment of the present invention is shown in FIGS. 10a–c. The aircraft interface suitable for use with small aircraft, as for example aircraft that have fold-down steps, has a slidable floor as the one depicted in FIGS. 3 and 4. As a consequence, FIGS. 10a–c point out the difference between the two embodiments; i.e. the alignment of the bumper 52 and 54 corresponds to a neutral position of the extensible portion 56 of the floor 48. FIG. 10a illustrates the extensible portion 56 in the neutral position whereas FIG. 10b shows the extensible portion in an extended position and FIG. 10c shows the extensible portion 56 of the floor 48 in a retracted position. The purpose of such a design is to provide general safety, enhanced fire protection and an adequate seal to the aircraft.

Numerous other embodiments may be envisaged without departing from the spirit and scope of the invention.

What is claimed is:

1. A passenger loading bridge interface for accommodating aircraft having a doorway with a door equipped with a set of stairs, the passenger loading bridge interface comprising:

a floor having a first edge for being disposed adjacent to a passenger loading bridge and a second edge for being positioned toward an aircraft, the floor including:

a non-extensible portion having an aircraft-engaging edge of a length similar to a width of a doorway of an aircraft and that is up to a width of a doorway of an aircraft, the aircraft-engaging edge of the non-extensible portion forming a part of the second edge for engaging one of a top step of an aircraft having a door that is equipped with a set of stairs including a top step that is approximately co-planar with a floor of the aircraft when the door is in an open condition and a doorway of an aircraft having a door that is equipped with a set of stairs whose top step is vertically distal from a floor of the aircraft and disposed elevationally therebelow when the door is in an open condition; and, an extensible portion that is linearly movable between an other than extended position for accommodating an aircraft having a door equipped with a set of stairs whose top step is vertically distal from a floor of the aircraft and disposed elevationally therebelow when the door is in an open condition, and an extended position for being extended beyond the aircraft engaging edge of the non-extensible portion in a direction that is towards an aircraft having a door equipped with a set of stairs including a top step that is approximately co-planar with a floor of the aircraft when the door is in an open condition, during engagement therewith.

2. A passenger loading bridge interface as defined in claim 1 comprising a drive mechanism for moving the extensible portion into the extended position when the non-extensible portion engages a top step of an aircraft having a door that is equipped with a set of stairs including a top step that is approximately co-planar with a floor of the aircraft when the door is in an open condition, and for moving the extensible portion into the other than extended position when the non-extensible portion engages a doorway of an aircraft having a door that is equipped with a set of stairs whose top step is vertically distal from a floor of the aircraft and disposed elevationally therebelow when the door is in an open condition.

3. A passenger loading bridge interface as defined in claim 2 wherein the non-extensible portion is fixed relative to the first edge.

4. A passenger loading bridge interface as defined in claim 3 wherein the aircraft-engaging edge of the non-extensible portion comprises at least a bumper element for engaging a portion of an aircraft proximate a doorway.

5. A passenger loading bridge interface as defined in claim 4 wherein the extensible portion includes an aircraft-engaging edge of a length that is longer than the length of the aircraft-engaging edge of the non-extensible portion in the direction of engagement, the aircraft-engaging edge of the extensible portion for engaging a portion of an aircraft that is other than proximate a doorway.

6. A passenger loading bridge interface as defined in claim 2 wherein the extensible portion in the extended position defines a floor surface extending beyond the aircraft-engaging edge of the non-extensible portion for substantially preventing passengers from falling from the passenger loading bridge.

7. A passenger loading bridge interface as defined in claim 2 wherein the extensible portion is slidably retained with supports for allowing the extensible portion to slide between the extended position and the other than extended position.

8. A passenger loading bridge interface as defined in claim 7 wherein the extensible portion, when in the other than extended position is disposed elevationally below and is substantially covered by the non-extensible portion of the floor.

9. A passenger loading bridge interface as defined in claim 2 wherein the drive mechanism comprises at least a hydraulic piston for moving the extensible portion between the extended position and the other than extended position.

10. A passenger loading bridge interface as defined in claim 2 wherein the drive mechanism comprises an electric actuator for moving the extensible portion between the extended position and the other than extended position.

11. A passenger loading bridge interface as defined in claim 2 wherein the extensible portion is flipable between at least a substantially horizontal position and an other than substantially horizontal position and including:
   a support for retaining the extensible portion in the substantially horizontal position;
   a pivot approximately aligned with the aircraft engaging edge of the non-extensible portion, for supporting a pivoting motion of the extensible portion between the at last a substantially horizontal position and the other than substantially horizontal position.

12. A passenger loading bridge interface as defined in claim 11 wherein the pivot comprises at least a hinge disposed between the extensible portion and the non-extensible portion of the floor.

13. A passenger loading bridge interface as defined in claim 11 wherein the support comprises at least one support bar movable into a support position and another position.

14. A passenger loading bridge interface as defined in claim 11 wherein the non-extensible portion is fixed relative to the first edge.

15. A passenger loading bridge interface an defined in claim 14 wherein the aircraft-engaging edge of the non-extensible portion comprises a bumper element for engaging a portion of an aircraft proximate a doorway.

16. A passenger loading bridge interface for accommodating aircraft having a doorway with a door equipped with a set of stairs, the passenger loading bridge interface comprising:
   a floor having a first edge for being disposed adjacent to a passenger loading bridge and a second edge for being positioned toward an aircraft, the floor including:
      a non-extensible portion having an aircraft-engaging edge of a length similar to a width of a doorway of an aircraft and that is up to a width of a doorway of an aircraft, the aircraft-engaging edge of the non-extensible portion forming a part of the second edge for engaging one of a top step of an aircraft having a door that is equipped with a set of stairs including a top step that is approximately co-planar with a floor of the aircraft when the door is in an open condition and a doorway of an aircraft having a door that is equipped with a set of stairs whose top step is vertically distal from a floor of the aircraft and disposed elevationally therebelow when the door is in an open condition; and,
      an extensible portion that is linearly movable between an other than extended position for accommodating an aircraft having a door equipped with a set of stairs whose top step is vertically distal from a floor of the aircraft and disposed elevationally therebelow when the door is in an open condition, and an extended position for being extended beyond the aircraft engaging edge of the non-extensible portion in a direction that is towards an aircraft having a door equipped with a set of stairs including a top step that is approximately co-planar with a floor of the aircraft when the door is in an open condition, during engagement therewith;
   a mechanism for moving the extensible portion between the extended position and the other than extended position comprising:
      a first mechanism for extending a first side of the extensible portion and a second mechanism for extending simultaneously a second side of the extensible portion opposite the first side,
      whereby upon a curvature of a surface of an aircraft, the first mechanism and the second mechanism co-operatively support an angled contact between the extensible portion and the surface of an aircraft having a curvature.

17. A passenger loading bridge interface as defined in claim 16 wherein the first mechanism and the second mechanism comprise a hydraulic piston.

18. A passenger loading bridge interface as defined in claim 16 wherein the first mechanism and the second mechanism comprise an electric actuator.

19. A method for aligning a passenger loading bridge with a doorway of an aircraft having a door that is equipped with a set of stairs including a top step that is approximately co-planar with a floor of the aircraft, comprising the steps of:
   providing an interface at an aircraft-engaging end of the passenger loading bridge, the interface including an interface floor having a non-extensible portion including a first aircraft-engaging edge and an extensible portion including a second aircraft-engaging edge;
   moving the interface toward the aircraft such that the first aircraft-engaging edge engages the top step of the set of stairs at a height that is approximately co-planar with the floor of the aircraft; and,
   linearly moving the extensible portion of the interface floor in direction that is approximately transverse to a length of the second aircraft-engaging edge between a non-extended position and an extended position such that the second aircraft-engaging edge closely approaches the aircraft at a point proximate the doorway, whereby the extensible portion covers at least some of a gap between the aircraft and the passenger loading bridge, such that passengers moving between the aircraft and the passenger loading bridge are substantially prevented from falling through the gap.

20. A method according to claim 19 wherein the step of moving the interface toward the aircraft is performed prior to the step of moving the extensible portion of the interface floor.

* * * * *